United States Patent Office 3,578,671
Patented May 11, 1971

3,578,671
OXAZOLES
Kevan Brown, Woodley, England, assignor to John Wyeth & Brothers Limited, Taplow, Maidenhead, Berkshire, England
No Drawing. Filed Nov. 6, 1967, Ser. No. 680,990
Int. Cl. C07d 85/44, 99/02
U.S. Cl. 260—307                                     13 Claims

ABSTRACT OF THE DISCLOSURE

A class of oxazole-2-polycarbon aliphatic monocarboxylic acids arylated at the 4- and/or 5-positions in the oxazole ring is described. Compounds of this class are active anti-inflammatory agents.

---

This invention relates to a novel group of oxazoles containing an aliphatic acid residue or a derivative thereof in the 2-position, to processes for the preparation thereof, and to pharmaceutical compositions containing such compounds.

The present invention provides oxazoles of the general formula:

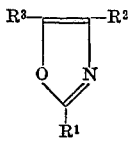

(I)

and acid addition salts thereof, in which $R^1$ is a saturated or unsaturated aliphatic acid residue containing at least two carbon atoms, or a derivative thereof, at least one of $R^2$ and $R^3$ is a substituted or unsubstituted aryl group (which may be a heteroaryl group) and the other radical $R^2$ or $R^3$, if not a substituted or unsubstituted aryl group (which may be a heteroaryl group), is a hydrogen atom or other suitable substituent, such as an organic residue.

The radicals $R^2$ and $R^3$ preferably are both monocyclic or bicyclic aromatic carbocyclic radicals (such as phenyl or naphthyl radicals) or heterocyclic aromatic radicals (such as thienyl or furyl radicals), any of which radicals may be substituted, but for simplicity all such aromatic radicals are referred to herein as aryl radicals. The aliphatic acid residue, or derivative thereof ($R^1$) can be saturated or unsaturated, straight or branched chained and advantageously contains 2 to 8 carbon atoms.

The compounds of the above general formula exhibit pharmacological activity, for example anti-inflammatory activity, as shown by tests on laboratory animals, or are intermediates in the prearation of other substituted oxazoles. As anti-inflammatory agents, the compounds of this invention generally have an advantage over other compounds currently in use as anti-inflammatory agents in that they show less tendency to induce or aggravate stomach ulcers. Certain compounds of the invention even appear to exhibit an anti-ulcer or prophylactic effect against ulcers in laboratory animals.

Examples of tests which can indicate that a compound has anti-inflammatory activity are those described by Winter et al. in Proc. Soc. Exp. Biol. Med., 111, 544 (1962); Buttle et al. in Nature, 179, 629 (1957); Konzett and Rossler in Arch. Path. Pharmac. 195, 71 (1940); and Newbould in Brit. Jour. Pharm. Chemoth., 21, 127–137 (1963).

The compounds of the above general Formula I may be prepared by suitable general methods known for forming an appropriately substituted oxazole ring. Such methods are well known, see for example "Heterocyclic Compounds," volume 5, by Robert E. Elderfield, 1957, published by Wiley and Sons, pages 302 to 323. The invention therefore also provides a process for preparing an oxazole of the above general formula, which comprises cyclising one or more reactants appropriately substituted by radicals $R^1$, $R^2$ and $R^3$ to form said oxazole, if desired carrying out any after processes, and if desired forming an acid addition salt thereof.

A convenient general method for preparing the oxazoles of general Formula I is based on Davidson's oxazole synthesis and comprises reacting a keto ester of the general formula:

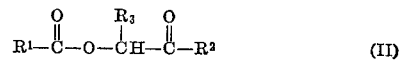

(II)

with ammonia or an equivalent thereof, such as urea or an ammonium salt, in which $R^1$, $R^2$ and $R^3$ have the meanings defined above. This reaction can be carried out with or without the use of a solvent. If a solvent is used, heating in solution from elevated temperature up to the boiling point of the solvent, for example, under reflux, is convenient. In this case, the use of an ammonium salt, e.g., ammonium acetate in glacial acetic acid has been found to be convenient. Alternatively, the reactants can be heated in a sealed tube.

The keto esters of general Formula II, which are not described in the art, can be prepared by esterifying an α-hydroxy-ketone of general formula

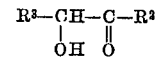

with an esterification agent capable of converting the α-hydroxy group to an α—O—CO—$R^1$ group, or a group itself convertible an α—OCO—$R^1$ group. For example, the esterification can be carried out with an appropriate anhydride, acid, acid halide, or other esterification agent. It is very convenient to use the acid anhydride, (for example succinic, glutaric or maleic anhydride) or the corresponding acid chlorides.

The esterification can be carried out by heating the reactants together at elevated temperature either in solution or in a sealed tube. Temperatures of up to 180° C. generally are suitable, for example 100–140° C. When an inert organic solvent is used, (e.g., a hydrocarbon) the esterification can be effected under reflux.

The starting materials for the above process are known or can be obtained in analogous manner to methods for preparing similar known compounds.

In the oxazoles of general Formula I provided by the invention, the radical $R^1$ in the 2-position is an aliphatic acid radical containing at least 2 carbon atoms or a derivative thereof, for example an ester, amide, salt, hydroxamic acid derivative or nitrile. The aliphatic acid radical can be straight chained or branched, saturated or unsaturated, and contains 2 to 6, preferably 2 to 4 carbon atoms. Examples of such acid radicals are acetic, acrylic, n-propionic, iso-propionic, n-butyric and iso-butyric.

The radicals $R^2$ and $R^3$ preferably are both aryl radicals, which may be the same or different, for example phenyl, naphthyl, thienyl and furyl radicals. Examples are phenyl, phenyl substituted by halogen (e.g., chlorine or bromine), by lower alkyl radicals containing up to 6 and preferably up to 4 carbon atoms (e.g., methyl, ethyl, n-propyl, iso-propyl, n-butyl and iso-butyl), by lower alkoxy radicals containing up to 6 and preferably up to 4 carbon atoms (e.g., methoxy), by nitro or by trifluoromethyl radicals, or substituted or unsubstituted naphthyl, thienyl or furyl radicals (e.g., 1-naphthyl, 2- or 3-thienyl or 2- or 3-furyl). However, one of the radicals $R^2$ and $R^3$ can be another suitable radical, for example an alkyl radical (e.g., methyl).

If the product obtained after carrying out one of the above processes is not that desired but a derivative thereof, it can be converted to the desired compound in known manner; for example, an ester, amide or nitrile can be converted to the acid by hydrolysis, or an ester can be converted to the hydroxamic acid derivative by reaction with hydroxylamine.

The oxazoles of general Formula I contain a basic ring nitrogen atom capable of forming acid addition salts with pharmaceutically acceptable acids, and the invention also provides such salts.

The invention further provides a pharmaceutical composition, which comprises a pharmaceutically active form of a compound provided by the invention and a non-toxic carrier. The pharmaceutically active form generally is when $R^1$ is a carboxylic acid group, which may be in salt form.

The pharmaceutically acceptable carrier of the composition of the invention can be a solid or a sterile liquid. Solid form compositions include powders, tablets and capsules. A solid carrier can be one or more substances, which may also act as flavouring agents, lubricants, solubilisers, suspending agents, binders, or tablet-disintegrating agents; it can also be an encapsulating material.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In many instances a compound is orally active and can be administered orally either in liquid or solid composition form.

The following non-limiting examples illustrate the invention.

EXAMPLE 1

β-(4,5-diphenyloxazol-2-yl)propionic acid (a) Benzoin (21.2 g.) and succinic anhydride (10.0 g.) were heated together at 120° C. for 6 hours. After cooling, the glass-like solid formed was dissolved in ether, and extracted with dilute aqueous sodium carbonate solution. The basic extract was washed once with ether, and then acidified with hydrochloric acid. The resulting oil was extracted with ether and the extract washed with water, dried over $Na_2SO_4$ and evaporated to give an oil which solidified to form prismatic crystals of benzoin hemisuccinate ester (27 g., 87%), M.P. 86–88° C. An analytical sample was recrystallized from aqueous acetone to give prisms, M.P. 88.5–89.5° C.

(b) Benzoin hemisuccinate ester (15 g.) and ammonium acetate (30 g.) were heated in refluxing glacial acetic acid (100 ml.) for 1½ hours. After cooling, the solution was poured into water, and the resulting crystalline precipitate was filtered off, washed with water, and recrystallized from methanol to give needle-like crystals of β-(4,5-diphenyloxazol-2-yl)propionic acid (11.7 g., 83%), M.P. 160.5–161.5° C.

*Analysis.*—$C_{18}H_{15}NO_3$ requires (percent): C, 73.8; H, 5.2; N, 4.8. Found (percent): C, 73.9; H, 5.4; N, 5.0.

EXAMPLE 2

β-[4,5-di-(4'-methoxyphenyl)oxazol-2-yl]propionic acid (a) Anisoin (13.6 g.) succinic anhydride (5.5 g.) and toluene (3 ml.) were heated with stirring such that the internal reaction mixture temperature was 135–140 for 5 hours.

The mixture was allowed to cool, ether (100 ml.) was added and the insoluble succinic anhydride removed by filtration. The filtrate was added to stirred 0.5 N sodium bicarbonate solution (250 ml.), the organic layer was separated and was extracted with further 0.5 N $NaHCO_3$ solution (2× 50 ml.). The combined aqueous layers were extracted once with ether (250 ml.) and acidified with concentrated HCl. The liberated oil was extracted into ethyl acetate (1× 100, 2× 50 ml.); and the combined organic phase washed well with water, dried ($MgSO_4$) and evaporated in vacuo to give a sticky foam of anison hemisuccinate. Yield 8.28 g. (44.4%).

(b) Anisoin hemisuccinate (5.52 g.) and urea (2.05 g.) in glacial acetic acid (30 ml.) were heated under reflux for 3 hours. The mixture was cooled and poured into ice/water (500 ml.). The liberated oil was extracted into ethyl acetate (3× 150 ml.). The combined organic phases were washed with water until the washings were essentially neutral and then extracted with 0.5 N sodium bicarbonate solutions (3× 75 ml.). The combined aqueous extracts were extracted with ethyl acetate (100 ml.), acidified with concentrated HCl and the resulting oil extracted with ethyl acetate (3× 100 ml.). After washing with water, drying ($MgSO_4$), removal of the solvent yielded a sticky solid (3.96 g.). Recrystallization from benzene/petrol (60–80) yielded tan-colored crystals of the title substance. Yield 2.65 g. (50.7%), M.P. 78–82° C.

A sample recrystallized for analysis (from benzene) had M.P. 81.5–84° C.

*Analysis.*—$C_{20}H_{19}NO_5$ requires (percent): C, 68.0; H, 5.4; N, 4.0. Found (percent): C, 67.8; H, 5.8; N, 4.0.

A further sample was converted to the sodium salt by neutralization with sodium hydroxide.

EXAMPLE 3

β-[4-(4'-methoxyphenyl)-5-phenyloxazol-2-yl]propionic acid

The procedure of Example 2 was followed, but 4-methoxybenzoin (12.1 g.) and succinic anhydride (5.5 g.) were reacted for 5 hours at 135–40° C. to obtain 4-methoxybenzoin hemisuccinate. Yield 10 g. (58.3%).

The procedure of Example 2(b) was then followed, but using this hemisuccinate (8.6 g.), urea (3.6 g.) and glacial acetic acid (25 ml.) to give the title compound. Yield 6.1 g. (75.1%), M.P. 118–20° C.

*Analysis.*—$C_{19}H_{17}NO_4$ requires (percent): C, 70.7; H, 5.3; N, 4.3. Found (percent): C, 70.5; H, 5.4; N, 4.5.

EXAMPLE 4

β-[4-(4'-methoxyphenyl)-5-(4'chlorophenyl)oxazol-2-yl]propionic acid

The procedure of Example 2(a) was followed, but 4'-chloro-4-methoxybenzoin (13.8 g.) and succinic anhydride (5.5 g.) were reacted for 7 hours at 135–40° C. to obtain 4' - chloro - 4 - methoxybenzoin hemisuccinate. Yield 10.8 g. (57.3%).

The procedure of Example 2(b) was then followed, but using this hemisuccinate (9.4 g.), urea (3.6 g.) and glacial acetic acid (25 ml.) to obtain the title compound. Yield 6.7 g. (75.2%), M.P. 130.5–132.5° C.

*Analysis.*—$C_{19}H_{16}ClNO_4$ requires (percent): C, 63.8; H, 4.5; N, 3.9; Cl, 10.1. Found (percent): C, 63.75; H, 4.5; N, 3.8; Cl, 9.9.

EXAMPLE 5

γ-(4,5-diphenyloxazol-2-yl)butyric acid (a) Benzoin (21.2 g.) and glutaric anhydride (11.4 g.) were reacted together following the manner described in Example 1 to yield benzoin hemiglutarate (18.3 g., 56%) as an oil. It had an I.R. spectrum consistent with its structure.

(b) Benzoin hemiglutarate (18.3 g.) and ammonium acetate (30 g.) were heated together in refluxing glacial acetic acid (100 ml.) for 2½ hours. Isolation, as in Example 1, yielded γ-(4,5-diphenyloxazol-2-yl)butyric acid (15.4 g., 89%) as needle crystals, M.P. 125–126° C.

*Analysis.*—$C_{19}H_{17}NO_3$ requires (percent): C, 74.3; H, 5.6; N, 4.6. Found (percent): C, 74.5; H, 6.0; N, 4.5.

EXAMPLE 6

β-(4,5-diphenyloxazol-2-yl)propionic acid ethyl ester

The acid of Example 2 (5 g.) in absolute ethanol (100 ml.) was heated under reflux with concentrated $H_2SO_4$ (1 ml.) for 16 hours. The mixture was cooled, evaporated in vacuo to about 50 ml., and poured into water (200 ml.). The colorless solid formed was filtered, washed with water, sodium bicarbonate, and water again. The solid (5.32 g.) was recrystallized from ethanol to give colorless needles of the title compound. Yield 4.4 g. An additional 0.21 g. crystallized from the mother liquors on standing. Total yield 4.61 g. (84.3%), M.P. 69.5–71° C.

Analysis.—$C_{20}H_{19}NO_3$ requires (percent): C, 74.8; H, 6.0; N, 4.4. Found (percent): C, 74.7; H, 6.1; N, 4.4.

EXAMPLE 7

β-(4,5-diphenyloxazol-2-yl)propionamide

Isobutyl chloroformate (1.23 g.) was added to a stirred suspension of β-(4,5-diphenyloxazol-2-yl)propionic acid (2.5 g.) in a mixture of dry tetrahydrofuran (10 ml.), dry dioxane (10 ml.) and triethylamine (0.85 ml. 9 mM.), cooled in ice. The mixture was stirred in ice for 30 minutes and then at room temperature for 1 hour. The mixture was cooled in ice, .880 ammonia (1 ml.) was added in one lot, and stirred for 16 hours. The mixture was poured into water (150 ml.) and the resulting solid collected. Yield 1.7 g. (72%), M.P. 146–7° C. after recrystallization from ethanol.

Analysis.—$C_{18}H_{16}N_2O_2$ requires (percent): C, 74.0; H, 5.5; N, 9.6. Found (percent): C, 74.2; H, 5.6; N, 9.6.

EXAMPLE 8

β-[5-(4'-chlorophenyl)-4-phenyloxazol-2-yl]propionic acid

The procedure of Example 2(a) was followed by 4'-chlorobenzoin (6.2 g.), (i.e., the phenyl ring adjacent to the hydroxy group is substituted) and succinic anhydride (2.75 g.) were reacted at 135–40° C. for 6 hours to obtain 4'-chlorobenzoin hemisuccinate. Yield 6.24 g. (69.7%).

The procedure of Example 2(b) was then followed, but using this hemisuccinate (6.24 g.), urea (3.0 g.) and glacial acetic acid (20 ml.) to give the title compound. Yield 3.25 g. (61.7%), M.P. 180–182° C.

Analysis.—$C_{18}H_{14}ClNO_3$ requires (percent): C, 66.0; H, 4.3; N, 4.3; Cl, 10.8. Found (percent): C, 66.1; H, 4.3; N, 4.1; Cl, 10.7.

EXAMPLE 9

β-[4-phenyl-5-(4'-methylphenyl)oxazol-2-yl]propionic acid

The procedure of Example 2(a) was followed but 4'-methylbenzoin (11.3 g.) and succinic anhydride were reacted together at 135–40° C. for 5 hours to obtain 4'-methylbenzoin hemisuccinate. Yield 11.0 g. (67.2%).

The procedure of Example 2(b) was then followed, but using this hemisuccinate (7.5 g.), urea (4.1 g.) and glacial acetic acid (20 ml.) to give the title compound. Yield 4.1 g. (63%), M.P. 169–70° C.

Analysis.—$C_{19}H_{17}NO_3$ requires (percent): C, 74.3; H, 5.6; N, 4.6. Found (percent): C, 74.3; H, 5.7; N, 4.6.

EXAMPLE 10

β-[4-(4'-chlorophenyl)-5-phenyloxazol-2-yl]propionic acid

The procedure of Example 2(a) was followed, but 4-chlorobenzoin (9.9 g.) and succinic anhydride (4.5 g.) were reacted together for 5 hours at 135–140° C. to obtain 4-chlorobenzoin hemisuccinate. Yield 10.5 g. (76%).

The procedure of Example 2(b) was then followed, but using this hemisuccinate and glacial acetic acid to give the title compound, M.P. 155–7° C.

Analysis.—$C_{18}H_{14}ClNO_3$ requires (percent): C, 66.0; H, 4.3; Cl, 10.8. Found (percent): C, 65.9; H, 4.3; Cl, 11.4.

EXAMPLE 11

β-[4-(4'-chlorophenyl) - 5 - (4'-methoxyphenyl)oxazol-2-yl]propionic acid

The procedure of Example 2(a) was followed, but 4-chloro-4'-methoxybenzoin and succinic anhydride were reacted together to obtain 4-chloro - 4' - methoxybenzoin hemisuccinate.

The procedure of Example 2(b) was then followed, but using this hemisuccinate to obtain the title compound, M.P. 126–8° C.

Analysis.—Calculated for $C_{19}H_{16}ClNO_4$ (percent): C, 63.8; H, 4.5; N, 3.9; Cl, 10.1. Found (percent): C, 63.7; H, 4.6; Cl, 10.05.

EXAMPLE 12

β-(4,5-diphenyloxazol - 2 - yl)propionic acid acetoxymethyl ester

β-(4,5-diphenyloxazol-2-yl)propionic acid (5.8 g.) was reacted in the presence of triethylamine (2.8 g.) with acetoxymethylbromide (1.84 ml.) in dimethylformamide (50 ml.). The mixture was left overnight at room temperature and then poured into water. The reaction mixture was extracted with ether and the extract washed with water, sodium bicarbonate and then water again before being dried ($MgSO_4$) and evaporated to give a solid. Yield 6.2 g. A further 1.1 g. was obtained on carrying out a second extraction. The product was recrystallised from ethyl acetate to give 5.0 g. (68.1%), M.P. 86–86.5° C.

Analysis.—$C_{21}H_{19}NO_3$ requires (percent): C, 69.0; H, 5.2; N, 3.8. Found (percent): C, 69.2; H, 5.35; N, 4.05.

By the same general preparative methods outlined in the foregoing examples, β[-4(2'4'-dimethoxyphenyl)-5-(4'-chlorophenyl)oxazol-2-yl]propionic acid, M.P. 118–120° C., β-(4,5-diphenyloxazol-2-yl)butyric acid, M.P. 77–81° C., β-[4-phenyl-5-(4'-chlorophenyl)oxazol-2-yl]propionic acid ethyl ester, M.P. 105–106 C., and β-(4,5-diphenyloxazol-2-yl)propionohydroxamic acid, M.P. 148° C., dec., were synthesized. In each case the empirical formula was confirmed by elemental analysis.

Examples of further compounds of general Formula I, which can be prepared by the methods outlined herein, are:

β-(4-phenyloxazol-2-yl)propionic acid;
β-(5-phenyloxazol-2-yl)propionic acid;
b-(4-methyl-5-phenyloxazol-2-yl)propionic acid;
β-(5-methyl-4-phenyloxazol-2-yl)propionic acid;
β-(4,5-diphenyloxazol-2-yl)acrylic acid;
4,5-diphenyloxazol-2-ylacetic acid;
β-[4-phenyl-5-(3'-trifluoromethylphenyl)oxazol-2-yl]propionic acid;
β-[4-phenyl-5-(2'-tolyl)oxazol-2-yl]propionic acid;
β-[4-phenyl-5-(3'-tolyl)oxazol-2-yl]propionic acid;
β-[4-phenyl-5-(4'-tolyl)oxazol-2-yl]propionic acid;
β-[4-phenyl-5-(2'-thienyl)oxazol-2-yl]propionic acid;
β-[4-phenyl-5-(2'-furyl)oxazol-2-yl]propionic acid;
β-[5-(1'-naphthyl)-4-phenyloxazol-2-yl]propionic acid;
β-[5-(2'-naphthyl)-4-phenyloxazol-2-yl]propionic acid;
β-[5-phenyl-4-(3'-trifluoromethylphenyl)oxazol-2-yl]propionic acid;
β-[5-phenyl-4-(2'-tolyl)oxazol-2-yl]propionic acid;
β-[5-phenyl-4-(3'-tolyl)oxazol-2-yl]propionic acid;
β-[5-phenyl-4-(4'-tolyl)oxazol-2-yl]propionic acid;
β-[5-phenyl-4-(2'-thienyl)oxazol-2-yl]propionic acid;
β-[5-phenyl-4-(2'-furyl)oxazol-2-yl]propionic acid;
β-[5-(1'-naphthyl)-4-phenyloxazol-2-yl]propionic acid;
β-[5-(2'-naphthyl)-4-phenyloxazol-2-yl]propionic acid;

β-[4-(4'-bromophenyl)-5-phenyloxazol-2-yl]propionic acid;
β-[4-(4'-fluorophenyl)-5-phenyloxazol-2-yl]propionic acid;
β-[5-(4'-bromophenyl)-4-phenyloxazol-2-yl]propionic acid;
β-[5-(4'-fluorophenyl)-4-phenyloxazol-2-yl]propionic acid;
β-[4,5-di-(4'-chlorophenyl)oxazol-2-yl]propionic acid;
α-(4,5-diphenyloxazol-2-yl)butyric acid;
α-(4,5-diphenyloxazol-2-yl)propionic acid;
β-[4-(4'-nitrophenyl)-5-phenyloxazol-2-yl]propionic acid;
β-[5-(4'-nitrophenyl)-4-phenyloxazol-2-yl]propionic acid;
β-(4,5-diphenyloxazol-2-yl)propionic acid methyl ester;
α-(4,5-diphenyloxazol-2-yl)propionamide;
α-(4,5-diphenyloxazol-2-yl)propionic acid ethyl ester;
β-(4,5-diphenyloxazol-2-yl)acrylic acid ethyl ester;
γ-(4,5-diphenyloxazol-2-yl)butyramide;
γ-(4,5-diphenyloxazol-2-yl)butyric acid ethyl ester;
4,5-diphenyloxazol-2-ylacetic acid ethyl ester;
4,5-diphenyloxazole-2-ylacetamide;
γ(4,5-diphenyloxazol-2-yl)valeric acid;

PHARMACOLOGIC COMPARISON

The oxazole of Example 1 was compared in respect to its anti-inflammatory and ulcerogenic effects with phenylbutazone and indomethacin, both of which are widely used for relief of inflammation. In this series of tests, anti-inflammatory effect was measured as a percentage inhibition of swelling due to experimentally induced paw oedema in rats. The experiments were conducted as follows:

Normal rats were arranged in balanced groups containing six animals. Food was removed from the animals' cages 20 hours before they were dosed orally with test or standard compounds; dosing was with 10 ml./kg. of a suspension of the drug in ½% carboxymethyl-cellulose and ½% Tween 80, via stomach tubes; a control group received vehicle only. One hour after dosing, 0.05 ml. of 1% carrageenin was injected into each hind paw, and within 60 seconds of injection the hind paw volumes were measured with a mercury plethysmograph. Three hours later the hind paw volumes remeasured, the rats were killed with nitrogen, and the stomachs were removed and pinned out for scoring ulcers. Each stomach was scored independently by two observers, taking into account extent of ulceration, haemorrhage, cell debris, and colour of mucosa, and the changes were assigned an arbitrary score from 0–5 by each. The results are summarised in the following table.

Similar paw odema tests with adrenalectomized rats gave like results with the compound of Example 1 indicating that the anti-inflammatory action is extra-adrenal. Other paw odema tests showed that this compound maintains approximately equal activity over a period of six hours, a significantly long-lasting response. This compound was also very effective in inhibiting bradykinin induced bronchoconstriction in guinea pigs, this action being another indication of anti-inflammatory value. Electrolyte excretion tests showed that animals dosed with this compound excreted sodium satisfactorily without excessive potassium loss.

What is claimed is:
1. A diaryl oxazol - 2 - yl polycarbon aliphatic monocarboxylic acid compound having the formula

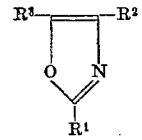

wherein each of the substituents $R^2$ and $R^3$ is a member of the group consisting of unsubstituted phenyl, naphthyl, thienyl and furyl radicals and phenyl radicals substituted by a substituent selected from the group consisting of halogen, lower alkyl, lower alkoxy, nitro and trifluoromethyl radicals; and wherein $R^1$ is selected from the group consisting of carboxyalkyl- and carboxyalkenyl radicals each containing from 2 to 5 carbon atoms and the amides, hydroxamic acid derivatives, lower alkyl esters and lower alkanoyloxy-lower-alkyl esters thereof.

2. β-(4,5-diphenyloxazol-2-yl)propionic acid.
3. β-[4,5-di-4'-methoxyphenyl)oxazol - 2 - yl]propionic acid.
4. β-[4-phenyl - 5 - (4' - methoxyphenyl)oxazol-2-yl]propionic acid.
5. β-[4-(4'-methoxyphenyl) - 5 - (4' - chlorophenyl)-oxazol-2-yl]propionic acid.
6. γ-(4,5-diphenyloxazol-2-yl)butyric acid.
7. Ethyl β-(4,5-diphenyloxazol-2-yl)propionate.
8. β-(4,5-diphenyloxazol-2-yl)propionamide.
9. β-[5-(4'-chlorophenyl) - 4 - phenyloxazol - 2 - yl]-propionic acid.
10. β-[4-phenyl - 5 - (4' - methylphenyl)oxazol-2-yl]propionic acid.
11. β-[4-(4'-chlorophenyl) - 5 - phenyloxazol - 2-yl]propionic acid.
12. β-[4-(4'-chlorophenyl) - 5 - (4' - methoxyphenyl)-oxazol-2-yl]propionic acid.
13. Acetoxymethyl β-(4,5 - diphenyloxazol - 2 - yl)-propionate.

| Compound | Dosage, mg./kg. | Edema volume, ml. | Percent inhibition | Stomach score | Degree of ulceration |
|---|---|---|---|---|---|
| Phenylbutazone | 20 | 0.248 | 51 | 11 | Severe. |
|  | 60 | 0.293 | 42 | 19 |  |
|  | 180 | 0.127 | 75 | 31 |  |
| Inxomethacin | 4.3 | 0.243 | 54 | 23 | Do. |
|  | 13.3 | 0.154 | 70 | 29 |  |
|  | 40 | 0.169 | 67 | 26 |  |
| Compound of Example 1 | 26.7 | 0.504 | 1 | 9 | None. |
|  | 80 | 0.403 | 21 | 4 |  |
|  | 240 | 0.275 | 46 | 11 |  |

References Cited

UNITED STATES PATENTS 3,470,195  9/1969  O'Mant _____ 260—307

OTHER REFERENCES

Tanaka, Yakugaku Zasshi, vol. 85, pp. 186–193 (1965).

ALTON D. ROLLINS, Primary Examiner

U.S. Cl. X.R.

260—332.3, 347.4, 485; 424—272